US012150497B2

(12) United States Patent
Redmond et al.

(10) Patent No.: US 12,150,497 B2
(45) Date of Patent: Nov. 26, 2024

(54) TEXTILE TRANSMISSION LINE ASSEMBLIES

(71) Applicant: Vorbeck Materials Corp., Jessup, MD (US)

(72) Inventors: Kate Redmond, Baltimore, MD (US); Dan Scheffer, Frederick, MD (US); Sriram Manivannan, Baltimore, MD (US); Keren Espina, Randallstown, MD (US); Ethan Traub, Jessup, MD (US); Jodie Kuo, Jessup, MD (US); John S Lettow, Washington, DC (US)

(73) Assignee: Vorbeck Materials Corp., Jessup, MD (US)

( * ) Notice: Subject to any disclaimer, the term of this patent is extended or adjusted under 35 U.S.C. 154(b) by 414 days.

(21) Appl. No.: 17/679,070

(22) Filed: Feb. 23, 2022

(65) Prior Publication Data

US 2022/0264965 A1    Aug. 25, 2022

Related U.S. Application Data

(60) Provisional application No. 63/152,523, filed on Feb. 23, 2021.

(51) Int. Cl.
*H01Q 1/27* (2006.01)
*A41D 1/00* (2018.01)
*H04B 13/00* (2006.01)

(52) U.S. Cl.
CPC ............. *A41D 1/002* (2013.01); *H01Q 1/273* (2013.01); *H04B 13/00* (2013.01)

(58) Field of Classification Search
CPC .......... A41D 1/00; A41D 1/002; A41D 1/005; A41D 1/04; H01Q 1/27; H01Q 1/273; H01Q 1/36; H01Q 1/38; H04B 13/00; H04B 1/3827; H04B 1/385
See application file for complete search history.

(56) References Cited

U.S. PATENT DOCUMENTS

| | | | |
|---|---|---|---|
| 7,658,901 B2 | 2/2010 | Prud'Homme et al. | |
| 8,278,757 B2 | 10/2012 | Crain et al. | |
| 10,098,587 B1 * | 10/2018 | Kuo | H04W 4/10 |
| 10,321,593 B1 * | 6/2019 | Lettow | H01Q 1/273 |
| 10,347,962 B1 * | 7/2019 | Georgakopoulos | H01Q 1/362 |
| 10,601,104 B2 | 3/2020 | Manivannan et al. | |

(Continued)

*Primary Examiner* — Tho G Phan
(74) *Attorney, Agent, or Firm* — Woods Oviatt Gilman LLP; Trent V. Bolar

(57) ABSTRACT

The present invention relates generally to transmission lines and specifically to textile transmission line assemblies. The textile transmission line assemblies are capable of lateral bending, axial rotation, and stretching without suffering from a statistically significant loss of its performance characteristics. Antenna elements are incorporated with the textile transmission line assemblies (hereinafter "combination assemblies"). The textile transmission line assemblies can be incorporated in to garments, apparel items, bags, tents, or other textile-based objects. The textile transmission line assemblies are configured to be flexibly affixed to textile items. The textile transmission line assemblies are impact resistant. Wearable communications systems that incorporate at least one textile transmission line assembly and/or combination assembly are also disclosed.

20 Claims, 15 Drawing Sheets

(56) References Cited

U.S. PATENT DOCUMENTS

| | | | |
|---|---|---|---|
| 10,613,047 B2* | 4/2020 | Cobanoglu | A41D 1/06 |
| 11,019,863 B2* | 6/2021 | Swallow | D02G 3/441 |
| 11,722,592 B2* | 8/2023 | Pinkos | H04M 1/05 |
| | | | 455/702 |

* cited by examiner

TEXTILE TRANSMISSION LINE ASSEMBLIES

CROSS-REFERENCE TO RELATED APPLICATIONS

This application claims priority to U.S. Provisional Application 63/152,523, filed Feb. 23, 2021, which is a continuation in part of U.S. patent application Ser. No. 16/798,712, filed Feb. 24, 2020, which claims priority to U.S. Provisional Application Ser. No. 62/861,974 filed Jun. 14, 2019. Each of the foregoing applications are hereby incorporated herein by reference.

STATEMENT REGARDING FEDERALLY SPONSORED RESEARCH OR DEVELOPMENT

This invention was made with government support under SOSSEC/AFRL OTA Number Project Announcement No. RIK-OTA-20-GWA. The U.S. Government has certain rights in this invention.

BACKGROUND

Technical Field

The present invention relates generally to transmission lines and specifically to textile transmission line assemblies. The simplest transmission line configuration is a tubular coaxial line. Striplines (i.e. planar transmission lines) were invented by flattening the coaxial configuration. Planar transmission lines are transmission lines with planar conductors, or in some cases dielectric (insulating) strips, that are flat, ribbon-shaped lines. The geometry of the transmission line is precisely controlled so that its electrical behavior is predictable. Planar transmission lines can be used for constructing components as well as interconnecting them. Wearable antennas and electronics could be the future of smart garments. Current wearable communications systems typically use rigid cables. Even more, such solutions often suffer from performance and/or mechanical degradation when exposed to environmental and/or chemical irritants. There exists a need in the art for flexible textile-based transmission lines for use in smart garments that maintain functionality when exposed to environmental and/or chemical irritants.

DETAILED DESCRIPTION

Figure 1:
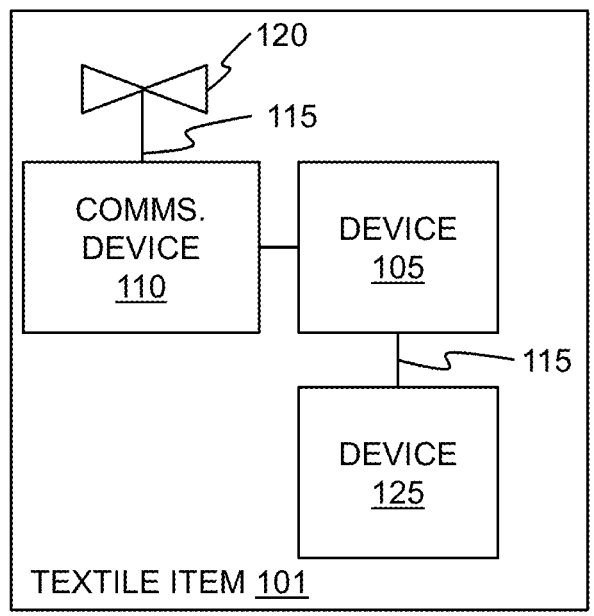
FIG. 1 depicts a block diagram of a textile transmission line assembly incorporated in to an apparel item, in accordance with some embodiments of the instant disclosure.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward,"

"front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, the terms "proximate" and "distal" referring, respectively, to positions or locations that are close or away from a point of reference, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

The present invention relates generally to transmission lines and specifically to textile transmission line assemblies. The simplest transmission line configuration known in the art is a coaxial line. Striplines (i.e. planar transmission lines) were invented by flattening the coaxial configuration. Planar transmission lines are transmission lines with planar conductors, or in some cases dielectric (insulating) strips, that are flat, ribbon-shaped lines. The geometry of the transmission line is precisely controlled so that its electrical behavior is predictable. Planar transmission lines can be used for constructing components as well as interconnecting them. Wearable antennas and electronics could be the future of smart garments. Current wearable communications systems typically use rigid transmission lines. Even more, such solutions often suffer from performance and/or mechanical degradation when exposed to environmental and/or chemical irritants. There exists a need in the art for flexible textile-based transmission lines for use in smart garments that maintain functionality when exposed to environmental and/or chemical irritants.

Embodiments of the instant disclosure seek to provide textile transmission line assemblies that are capable of lateral bending, axial rotation, and stretching without suffering from a statistically significant loss of its performance characteristics. Other aspects of the instant disclosure seek to provide antenna elements that are incorporated with the textile transmission line assemblies (hereinafter "combination assemblies"). In certain aspects, the instant disclosure seeks to provide textile transmission line assemblies for incorporation in to garments, apparel items, bags, tents, or other textile-based objects. In other words, the textile transmission line assemblies of the instant disclosure are configured to be flexibly affixed to textile items. Some aspects of the instant disclosure seek to provide textile transmission line assemblies that are impact resistant. Additional aspects of the instant disclosure seek to provide wearable communications systems that incorporate at least one textile transmission line assembly and/or combination assembly.

Embodiments of the instant disclosure will now be discussed in detail with reference to the Figures, which are included herein to aid in the description of the textile transmission line assemblies. FIG. 1 depicts a block diagram of a textile transmission line assembly 115 (hereinafter "assembly 115") that is flexibly affixed to an apparel item 101, in accordance with some embodiments of the instant disclosure. The textile item 101 as well as assembly 115 are items that are made using a textile. Applicable textiles include, but are not limited to, textiles that are woven or unwoven, natural or synthetic, knitted, crocheted, knotted, tatted, felted, bonded, and braided. As used herein, the term "textile" also includes fabrics and cloths. For example, the textile item 101 can be a garment item, apparel item, bag, luggage, tent, or structure that includes textile material.

The assembly 115 is a multilayered textile transmission line that conductively couples at least two devices together. To be sure, the assembly 115 is configured to be flexibly affixed to textile items. Layers of the assembly 115 can be affixed together using any suitable means, including tape, adhesives, thermal or pressure sealing materials (e.g., polyurethanes, PVC, etc.). In some embodiments, the assembly 115 terminates in a connector (e.g., a coaxial connector). The components of the assembly 115 are preferably co-aligned with each other. The assembly 115 uses dielectric material, textiles coated with dielectric material, and/or pre-formed dielectric material affixed to textiles. In other words, the dielectric material can include dielectric coatings or be dielectric laminates. Applicable dielectric material includes, but is not limited to, foams (closed and open cell), papers, cellulose, PVDF, rubbers, elastomers, fluoropolymers (such as polyvinylidene fluoride), neoprenes, melamine, polyamides, spandex, thermoplastic elastomers, epichlorohydrin foams, spandex, scuba fabric (polyester/spandex blend), and similar materials. As shown in FIG. 1, a copy of the assembly 115 conductively couples a device 105 to a device 125 and another copy conductively couples a communications device 110 to an antenna element 120. The communications device 110 can be any communications device known in the art. The assembly 115 includes planar conductive strips and conductive shielding layers that are formed using a conductive composition that includes a polymer and a metal, fully exfoliated graphene sheets, carbon nanotubes, carbon black, and/or graphite. To be sure, the structural and electrical characteristics of fully exfoliated graphene sheets, carbon nanotubes, and graphite are dissimilar; hence, their performance characteristics in the conductive composition are dissimilar.

For example, embodiments that incorporate fully exfoliated single sheets of graphene (hereinafter "graphene sheets") in the conductive composition, as opposed to carbon nanotubes, carbon black or graphite, exhibited an ability to undergo lateral bending, axial rotation, as well as lateral and longitudinal stretching without suffering from mechanical degradation (e.g., coating cracks and/or flaking) and/or a reduction in electrical performance (e.g., signal loss or degradation). The fully exfoliated single sheets of graphene can be present in the polymer matrix as a three-dimensional percolated network, which is denser than that formed using the much thicker. In other words, since the graphene sheets are each a one-atom thick layer of carbon (i.e. two-dimensional), its percolation threshold is lower compared to that of the three-dimensional carbon nanotubes, carbon black, or graphite.

Applicable polymers include, but are not limited to, polyethylene terephthalate, acrylic, rayon, aramid, modacrylic, spandex, nylon, olefin, polyester, saran, sulfur, polypropylene, polyethylene, elastane, and similar polymers. Applicable metals include, but are not limited to, copper, gold, silver, aluminum, tungsten, other metals, a metal alloy, or a combination of two or more thereof. To form structures described in the instant disclosure, the conductive composition is preferably printed (e.g., screen printed) on a textile. In some aspects, the conductive composition can be deposited, such as by sputtering, plating, etching, molding, coating, metallization, vapor deposition, adhering, gluing, taping, or other applicable deposition techniques, in accordance with an embodiment of the instant disclosure. The antenna elements 120 are planar, flexible conductors having a reduced visual signature (e.g., less than 3 mm thick) that are preferably made using the conductive composition. In general, the antenna elements 120 can be made using any conductive material that facilitates the transmission and reception of electromagnetic waves in accordance with an embodiment of the instant disclosure.

In conductive composition can be formed to exhibit a conductivity of at least about 10 S/cm, or at least about 100 S/cm, or at least about 250 S/cm, or at least about 500 S/cm, or at least about 750 S/cm, or at least about 1000 S/cm, or at least about 2000 S/cm, or at least about 5000 S/cm, or at least about 10,000 S/cm. In certain embodiments, the conductive composition is a conductive ink that has a sheet resistivity in the range of 150-200 Ohms/square with a dry ink thickness approx. 1 micrometer. The viscosity of the conductive composition is much higher than of standard graphic inks: greater than 2 mins elution time from Zahn #2 cup, which corresponds to approx. 100 s from Ford #4 cup (used to control viscosity of most fluid inks) or 3.5 Pa·s, where typical flexographic inks viscosity is approx. 20-25 s (Ford #4 cup) or 0.6 Pa·s (Eldred, 2001). Here, the conductive composition is also shear-thinning (i.e. thixotropic) unlike standard flexographic ink; however, this does not seem to influence the results in any way.

Figure 2:
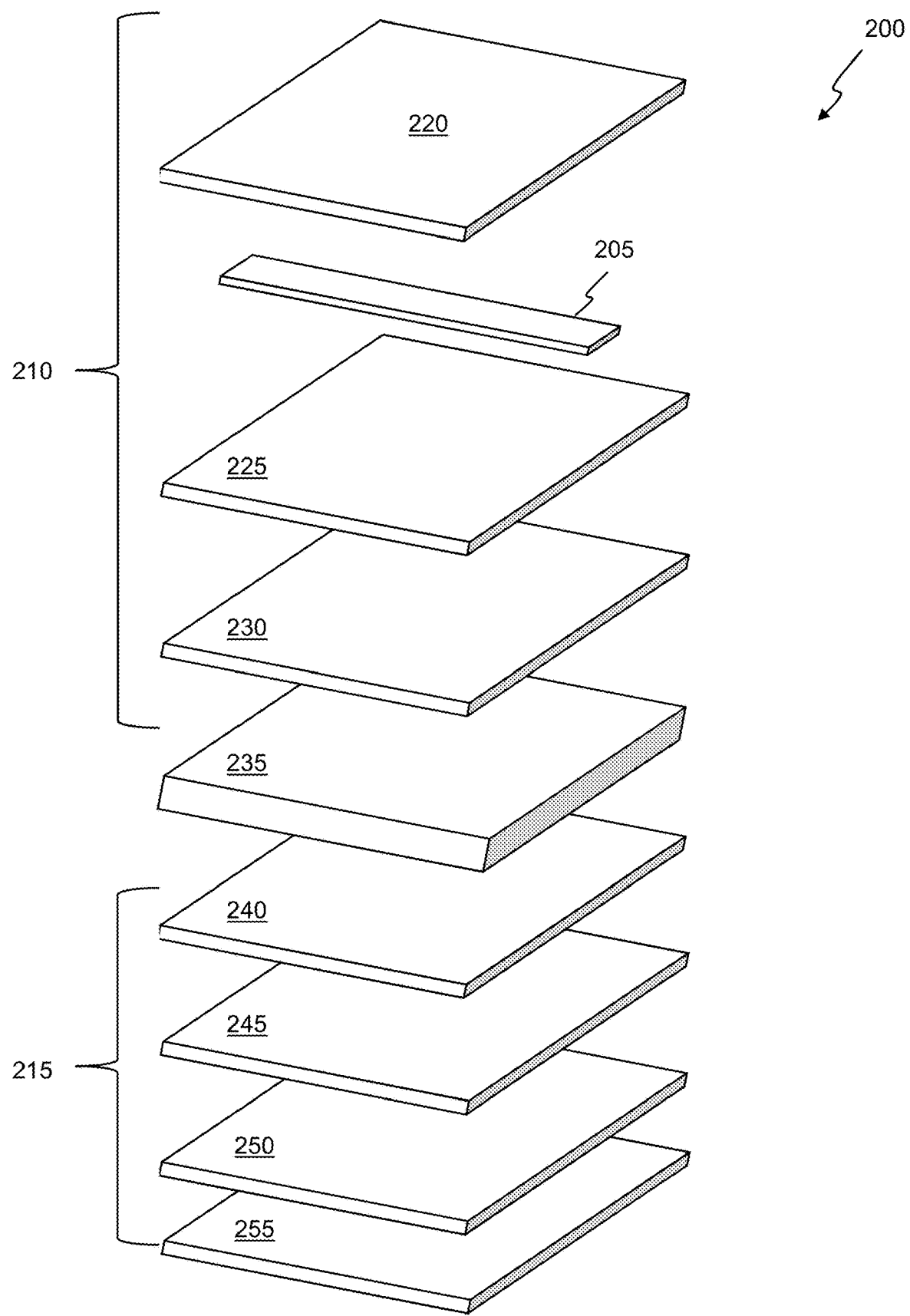
FIG. 2 depicts an exploded perspective view of a portion of a textile transmission line assembly, in accordance with other embodiments of the instant disclosure.
Figure 6:
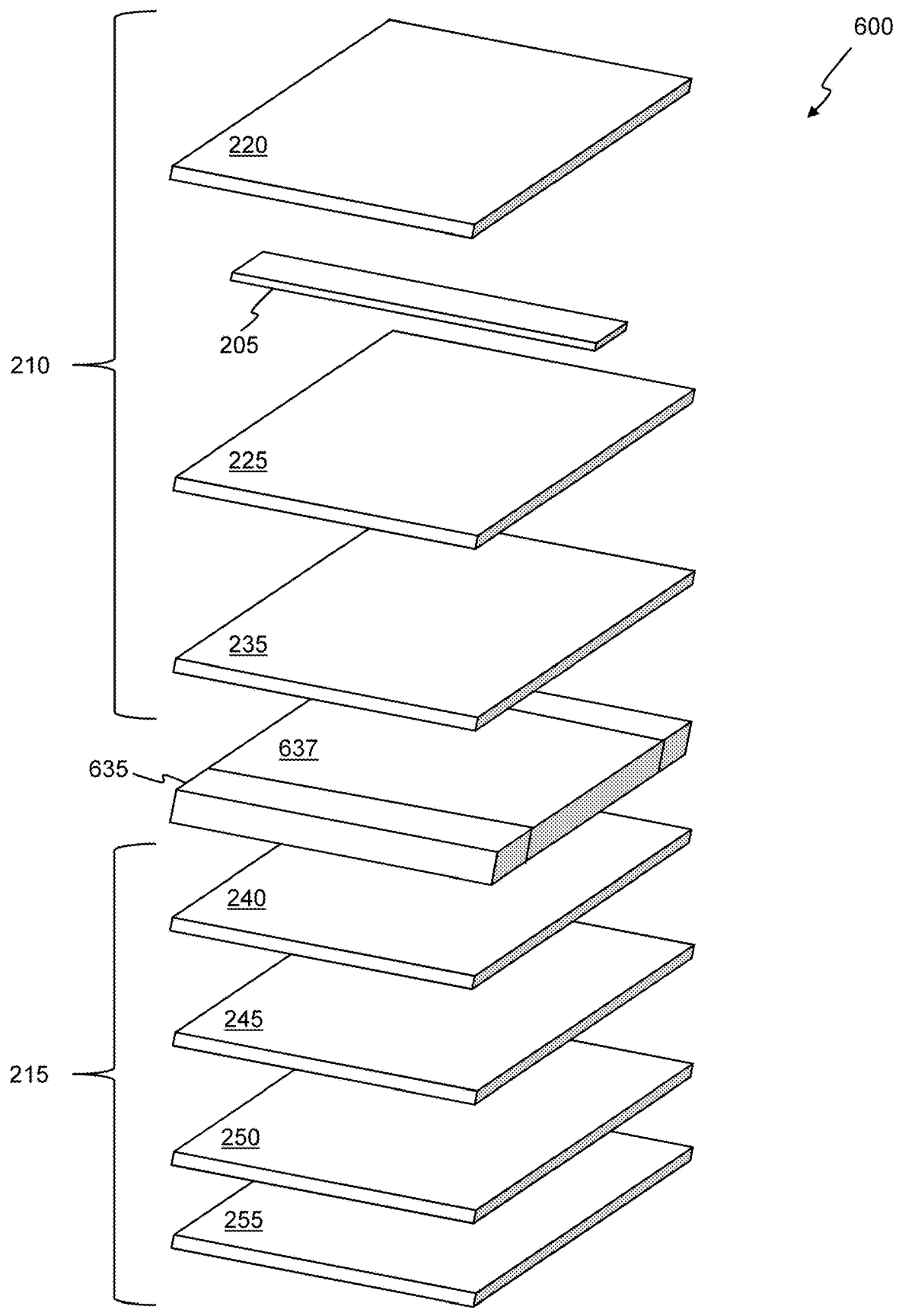
FIG. 6 depicts an exploded perspective view of a portion of a textile transmission line assembly, in accordance with other embodiments of the instant disclosure.

FIG. 2 depicts an exploded perspective view of a portion of an assembly 200, in accordance with other embodiments of the instant disclosure. The assembly 200 is an embodiment of the assembly 115 and shares a plurality of components and/or functionalities therewith. The assembly 115 preferably includes a dielectric spacer 235, a conductive trace assembly 210, and a conductive ground assembly 215, each of which are flexible textile components. The dielectric spacer 235 is a flexible textile that is made of dielectric material and/or is coated with a dielectric material. For example, in some embodiments a PVDF foam and a scuba knit polyester/spandex blend are used, as shown in FIG. 6.

The conductive trace assembly 210 and the conductive ground assembly are positioned on the dielectric spacer 235 opposite each other (i.e. on opposing sides of the dielectric spacer 235). From the top down, the conductive trace assembly 210 includes a planar conductive strip 205 and a first encapsulating layer 220 that is positioned proximate to and co-aligned with the planar conductive strip 205. The planar conductive strip 205 is preferably formed on the textile substrate 225 using the conductive composition and an aforementioned application technique. In other embodiments, the planar conductive strip 205 is formed then affixed to the substrate 205. The textile substrate 205 is positioned on a textile layer 230, which is positioned on the dielectric spacer 235. The first encapsulating layer 220 is a textile that encloses the planar conductive strip 205 on the dielectric spacer 235. In some embodiments, the first encapsulating textile layer 220 encloses the planar conductive strip 205 on the textile substrate 225 or the textile layer 230, which is then affixed to the dielectric spacer 235.

The dielectric spacer 235 can be a dielectric material or a textile substrate coated with a dielectric material. Embodiments of the instant disclosure require that the planar conductive strip 205 be dielectrically isolated to ensure proper functioning of the assemblies and combination assemblies disclosed herein. From the bottom up, the conductive ground assembly 215 includes a conductive shielding layer 250 positioned on a textile substrate 245, which is positioned on a textile layer 240, which is positioned proximate to (e.g., affixed to) the dielectric spacer 235 opposite the conductive trace assembly 210. The conductive shielding layer 250 is preferably formed using the conductive composition and applied on the textile substrate 245 using an aforementioned application technique. A second encapsulating textile layer 255 is positioned proximate to (e.g., affixed to) the conductive shielding layer 250. The second encapsulating layer 255 is a textile that encloses the conductive shielding layer 250 on the dielectric spacer 235. In some embodiments, the second encapsulating textile layer 255 encloses the conductive shielding layer 250 on the textile substrate 245 or the textile layer 240 both of which are positioned proximate to the dielectric spacer 235. The second encapsulating textile layer 255 is co-aligned with the conductive shielding layer 250.

In some embodiments, the encapsulating textile layer 220 and/or the encapsulating textile layer 255 is waterproof and chemical resistant (e.g., certified to NFPA 1194 (2018 Edition) for both Class 1 and Class 2), which allows the assembly 200 to exhibit CBRN (chemical, biological, radiological and nuclear) and/or HAZMAT (hazardous materials) protection. Similarly, the encapsulating layer 220 and/or the encapsulating layer 255 can exhibit dielectric properties (i.e. be a dielectric textile). To be sure, other encapsulating textile layers (i.e. outer-most layer) of the instant disclosure can exhibit similar protections. When assembled, the conductive trace assembly 210 is operatively coupled to the conductive ground assembly 215. More specifically, when assembled, the planar conductive strip 205 is operably coupled to the conductive shielding layer. Similarly, when assembled, the conductive trace assembly 210 is co-aligned with the conductive ground assembly 215.

Figure 3:
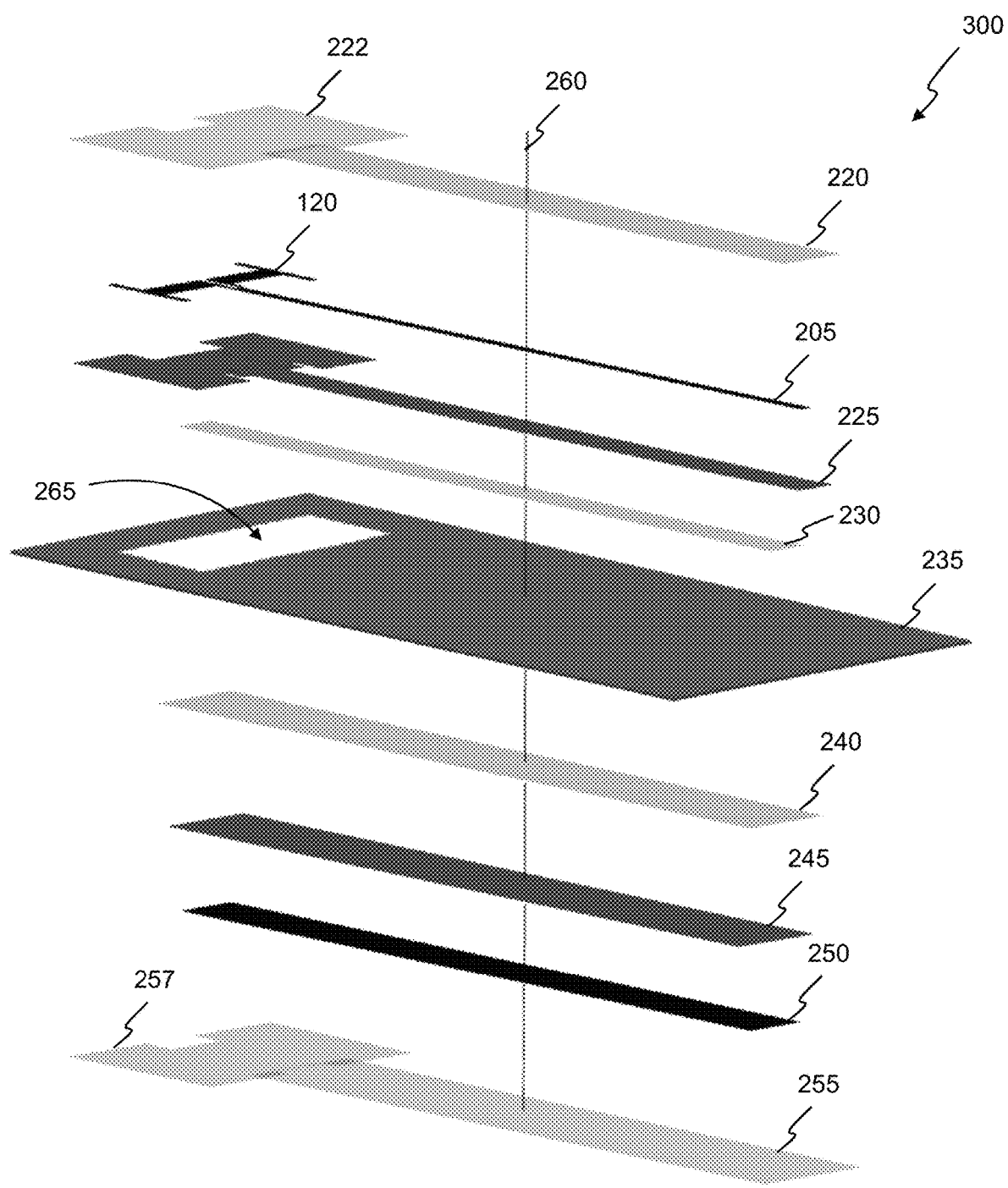
FIG. 3 depicts an exploded perspective view of a combination assembly that include the textile transmission line assembly of FIG. 2 and an antenna element 120 conductively coupled thereto, in accordance with certain embodiments of the instant disclosure.
Figure 4:
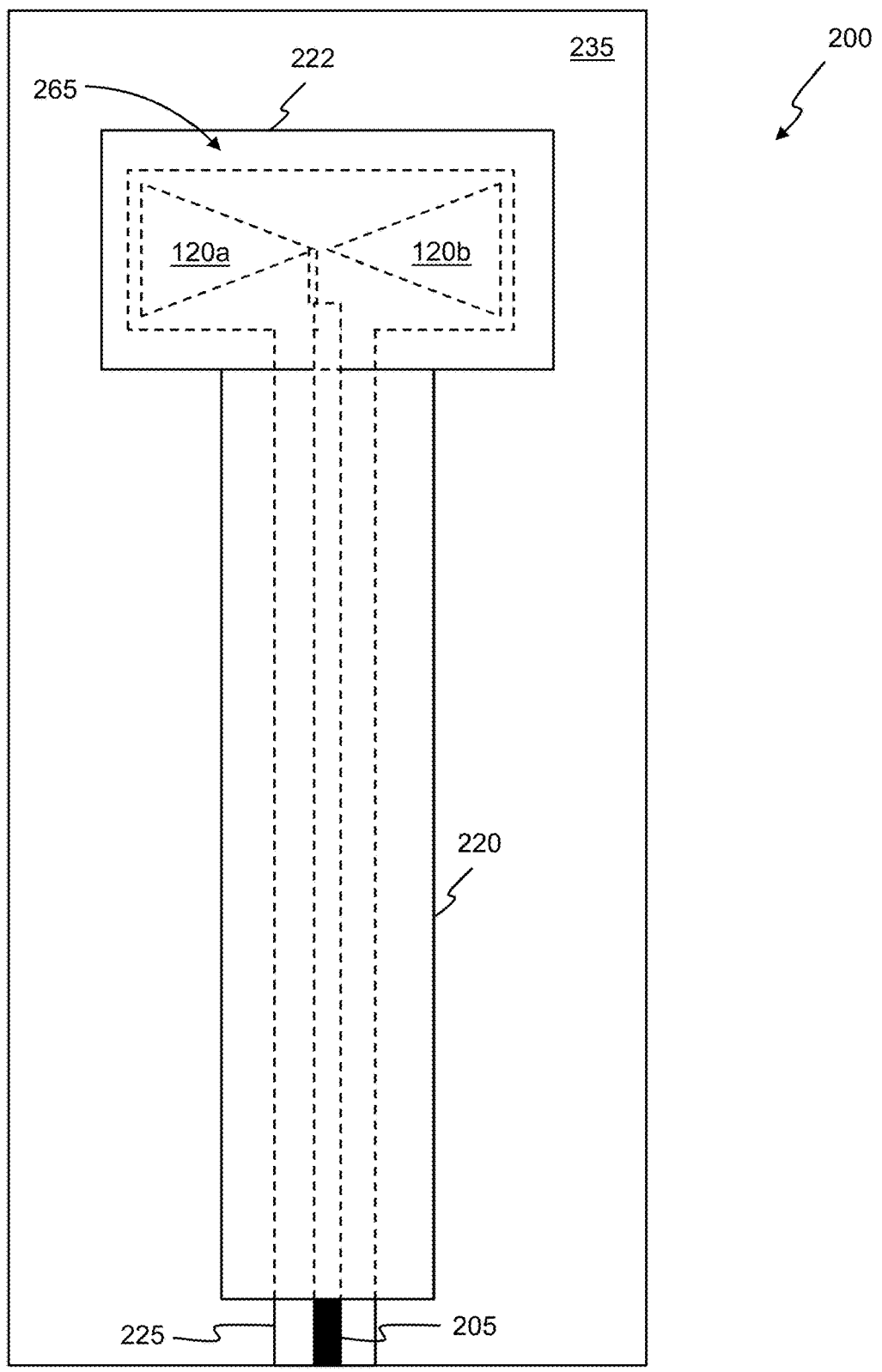
FIG. 4 depicts a top view of the textile transmission line assembly of FIG. 3, in accordance with yet still other embodiments of the instant disclosure.
Figure 5:
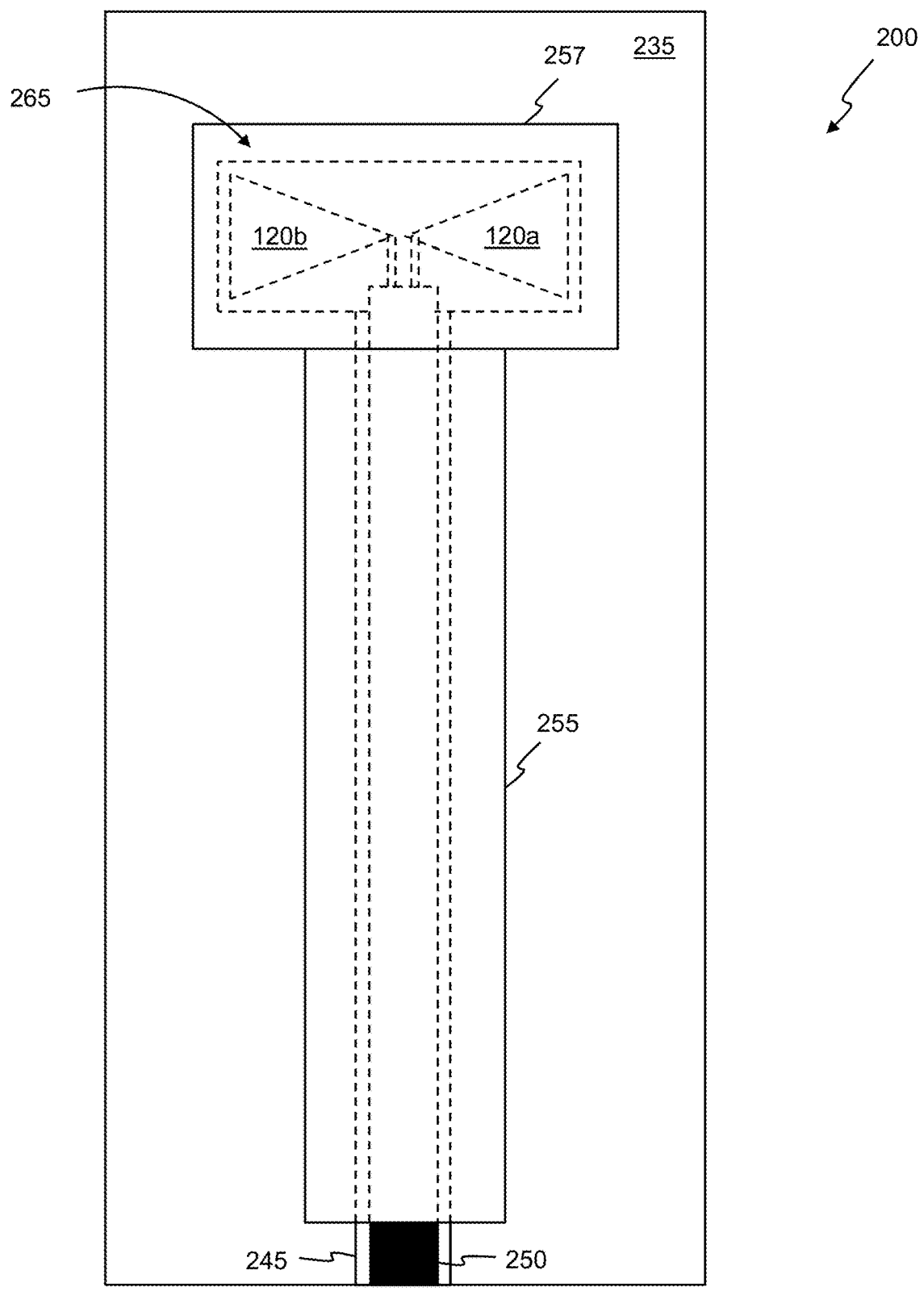
FIG. 5 depicts a rear view of textile transmission line assembly of FIG. 3, in accordance with some embodiments of the instant disclosure.

FIG. 3 depicts an exploded perspective view of a combination assembly 300 that includes the assembly 200 and an antenna element 120 conductively coupled thereto, in accordance with certain embodiments of the instant disclosure. Here, the antenna element 120 and the planar conductive strip 205 together form a continuous conductive structure. To incorporate the antenna element 120, the dielectric spacer 235, which is a rectangular textile, includes a void 265 positioned at an end thereof that is free of the dielectric spacer 235 material. When assembled, the antenna element 120 is positioned in the void 265 and laterally surrounded by dielectric material. The substrate textile 225 includes additional material on which the antenna element 120 is positioned on. Referring now to FIGS. 3 and 4, the encapsulating textile layer 220 and the encapsulating textile layer 255 include additional material, a portion 222 and a portion 257, that together enclose the antenna element 120 therein. FIG. 6 depicts an exploded perspective view of a portion of a textile transmission line assembly, in accordance with other embodiments of the instant disclosure.

Figure 7:
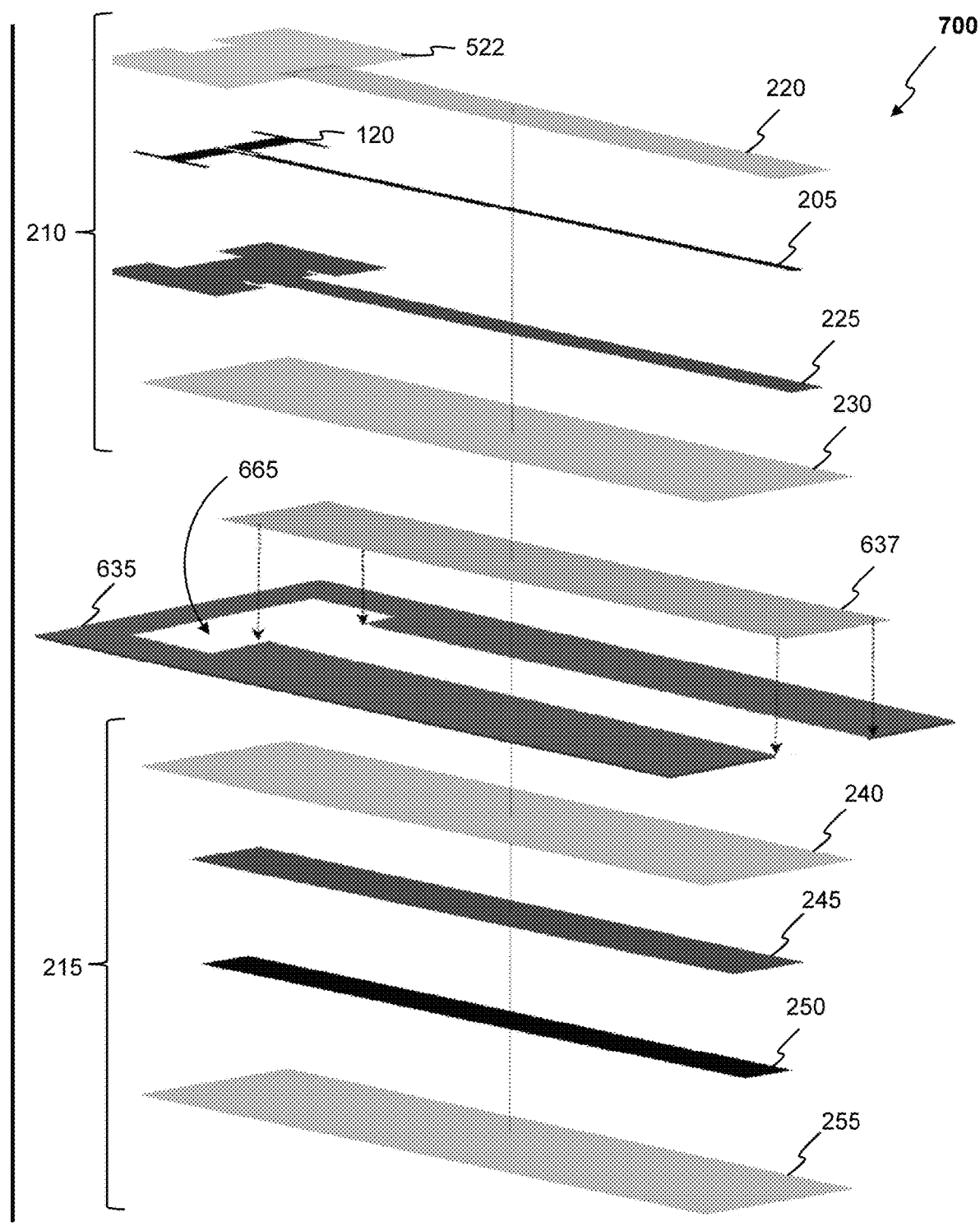
FIG. 7 depicts an exploded perspective view of a combination assembly that includes the textile transmission line assembly of FIG. 6 and an antenna element 120 conductively coupled thereto, in accordance with certain embodiments of the instant disclosure.
Figure 8:
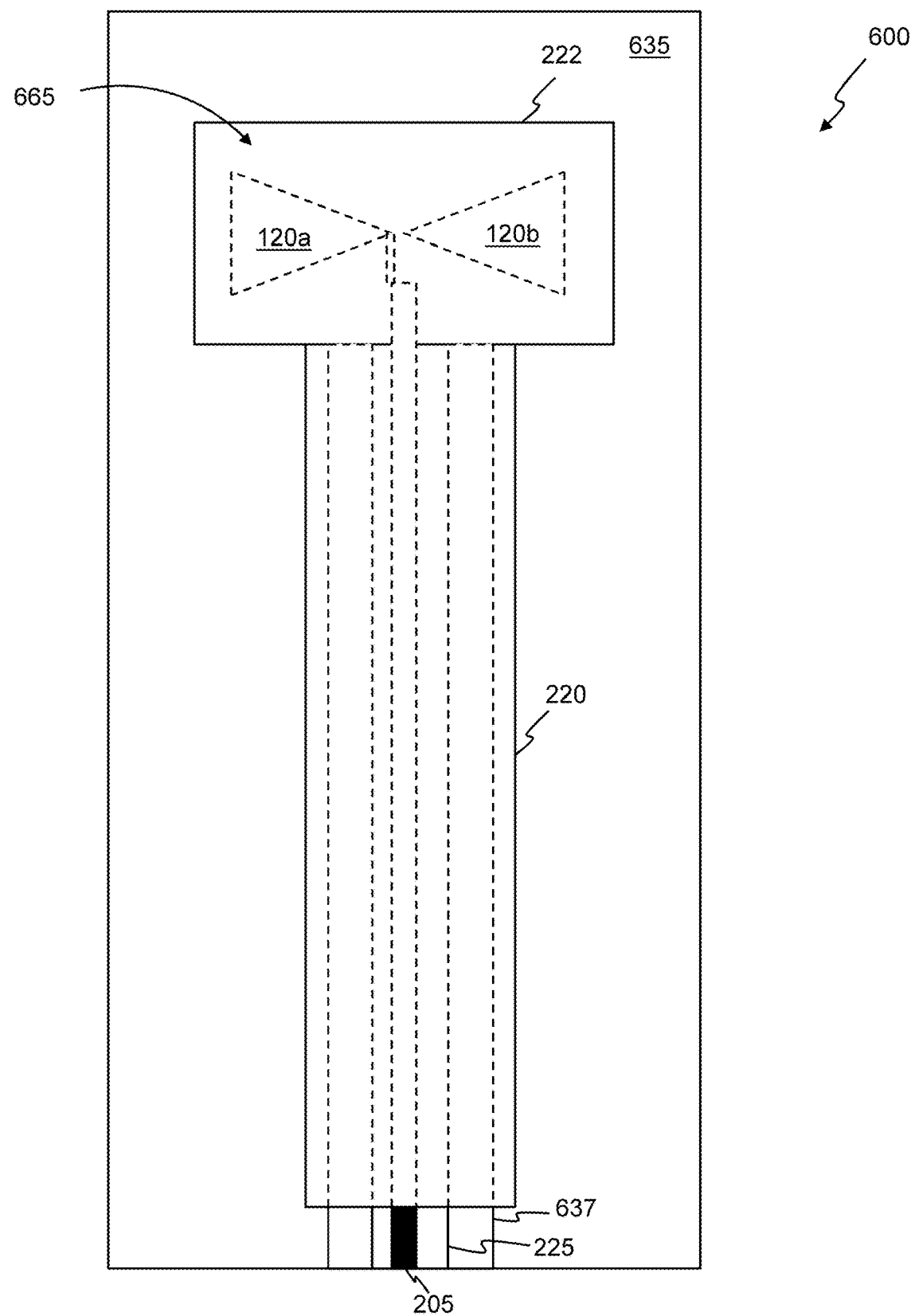
FIG. 8 depicts a top view of the textile transmission line assembly of FIG. 6, in accordance with yet still other embodiments of the instant disclosure.
Figure 9:
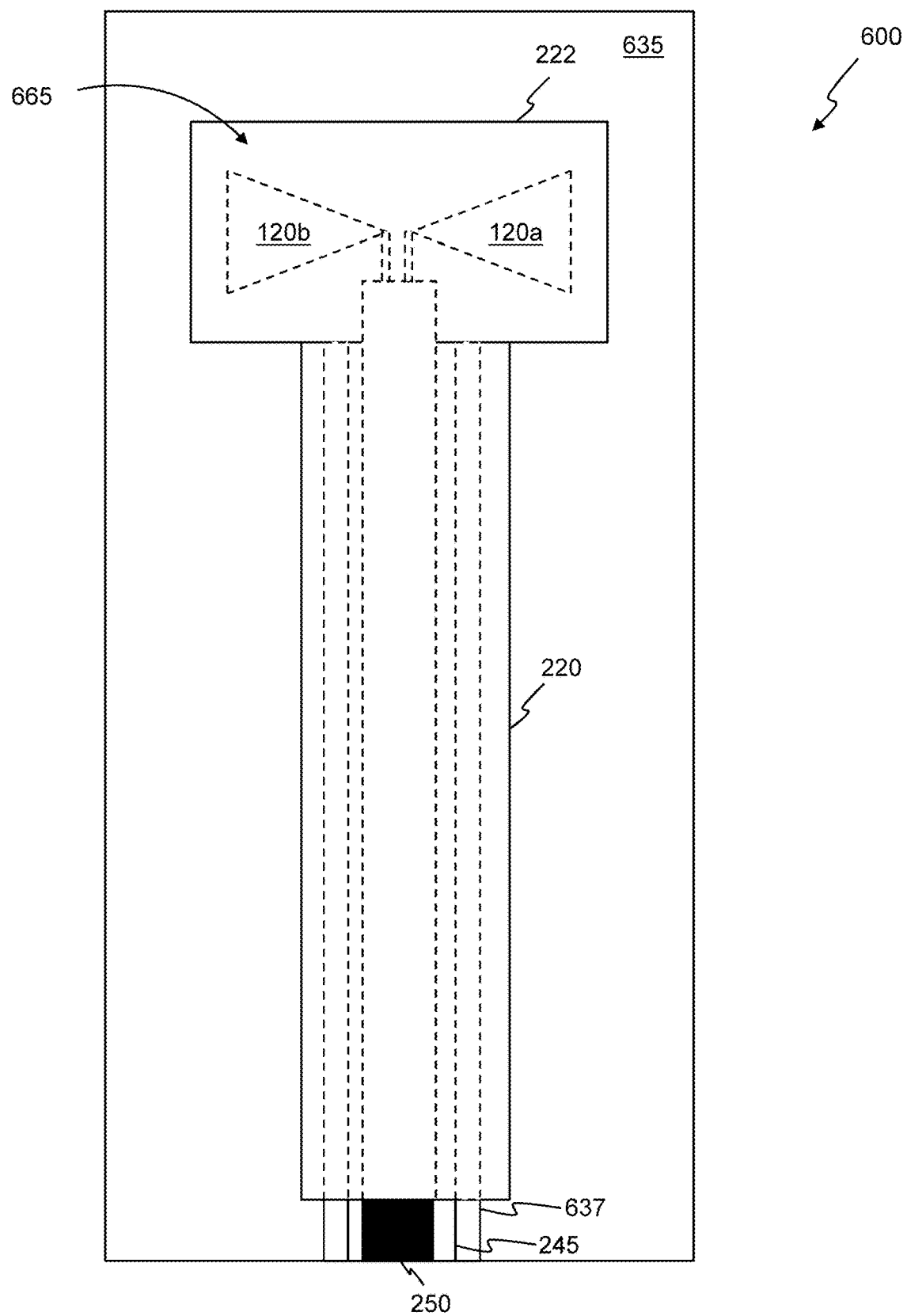
FIG. 9 depicts a rear view of the textile transmission line assembly of FIG. 6, in accordance with some embodiments of the instant disclosure.

FIG. 6 depicts an exploded perspective view of a portion of an assembly 600, in accordance with other embodiments of the instant disclosure. The assembly 600 is an embodiment of the assembly 115. The assembly 600 includes a dielectric spacer 635 that includes a dielectric textile 637 both of which are positioned between the conductive trace assembly 210 and the conductive ground assembly 215. FIG. 7 depicts an exploded perspective view of a combination assembly 700 that includes the assembly 600 and an antenna element 120 conductively coupled thereto, in accordance with certain embodiments of the instant disclosure. FIGS. 8 and 9 depict a top view and a bottom view, respectively, of the combination assembly 700, in accordance with yet still other embodiments of the instant disclosure. To incorporate the antenna element 120, the dielectric spacer 635, which is a rectangular textile, includes a void 665 positioned along the central axis that openly initiates and an end of the dielectric spacer 635 and terminates at the opposite end. The dielectric textile 637 is preferably wider than both the conductive shielding layer 250 and the planar conductive strip 205. The void 665 is free of the dielectric spacer 235 material and, when assembled, accommodates the dielectric textile 637 and the antenna element 120. In other words, when assembled, the antenna element 120 and the dielectric textile 637 are both positioned in the void 665 in a manner where the antenna element 120 is laterally surrounded by dielectric material.

Figure 10:
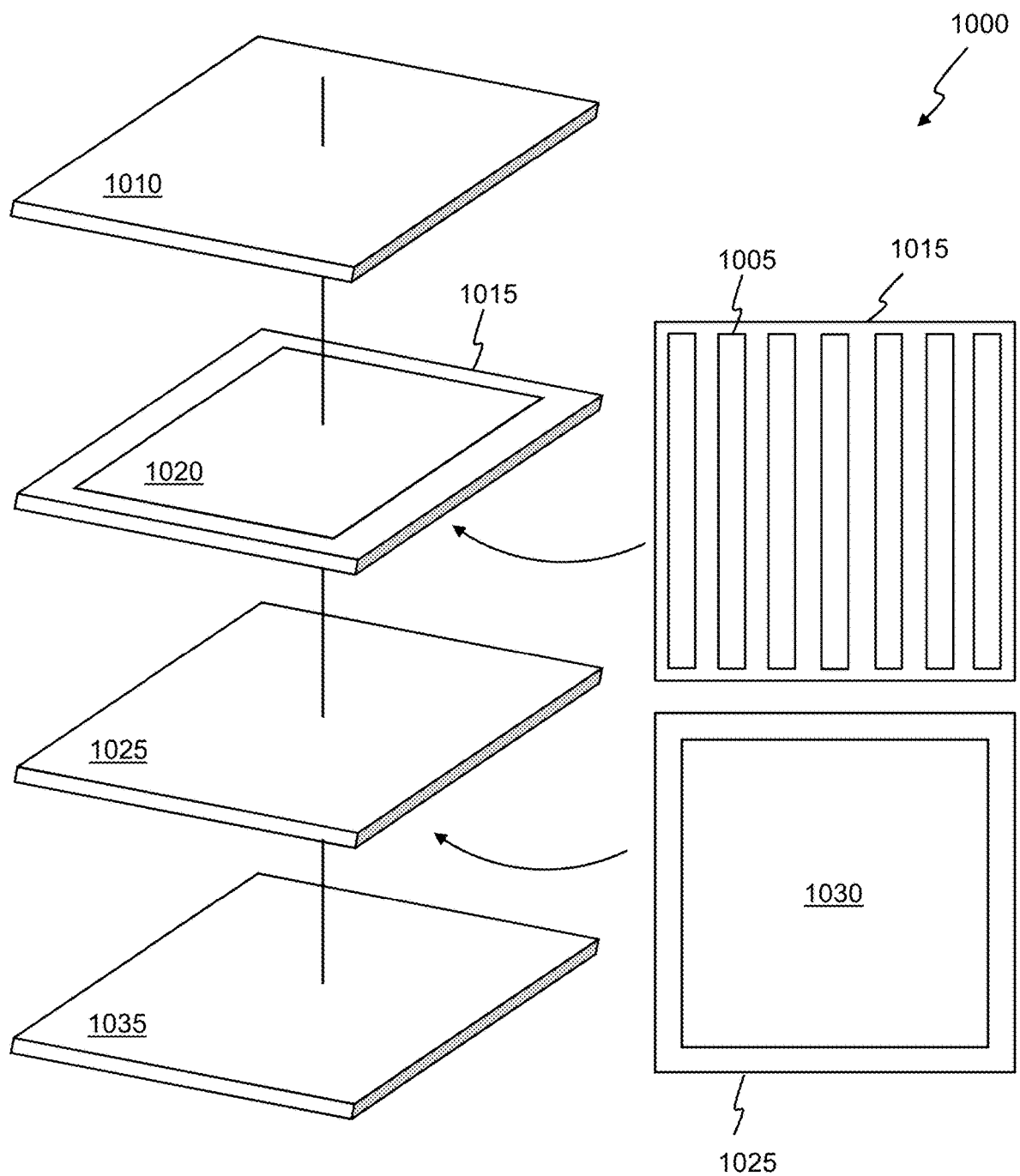
FIG. 10 depicts an exploded perspective view of a signal routing textile transmission line assembly that includes a planar conductive strip and a conductive shielding layer applied on separate dielectric material, in accordance with other embodiments of the instant disclosure.

The assembly 115 can also be configured to be a signal routing transmission line (hereinafter "routing assembly"). FIGS. 10-15 depict multilayered textile routing assemblies, according to certain embodiments of the instant disclosure. FIG. 10 depicts an exploded perspective view of a routing assembly 1000 that includes planar conductive strips 1005 and a conductive shielding layer 1030 applied on separate dielectric material, in accordance with other embodiments of the instant disclosure. The routing assembly 1000 is an embodiment of the assembly 115. Specifically, a dielectric textile 1050, a dielectric spacer, includes a conductive shielding layer 1020 positioned on one side thereof and a plurality of planar conductive strips 1005 positioned on the other side. The plurality of planar conductive strips 1005 are co-aligned with each other can each carry a different signal. Similarly, the combination assembly 1000 further includes a dielectric textile 1025, a dielectric spacer, that includes a conductive shielding layer 1030 positioned on one of its surfaces. When assembled, the dielectric textile 1015 is affixed to the dielectric textile 1025 such that the plurality of planar conductive strips 100 are positioned therebetween while the conductive shielding layer 1020 and the conductive shielding layer 1030 are oriented outward. The routing assembly 1000 also includes a textile encapsulating layer 1010 and a textile encapsulating layer 1035. When assembled, from the top down, the textile encapsulating layer 1010 is positioned on the dielectric textile 1015 proximate to the conductive shielding layer 120, which is positioned on the dielectric textile 1025 as previously mentioned. The dielectric textile 1025 is positioned on the textile encapsulating layer 1035.

Figure 11:
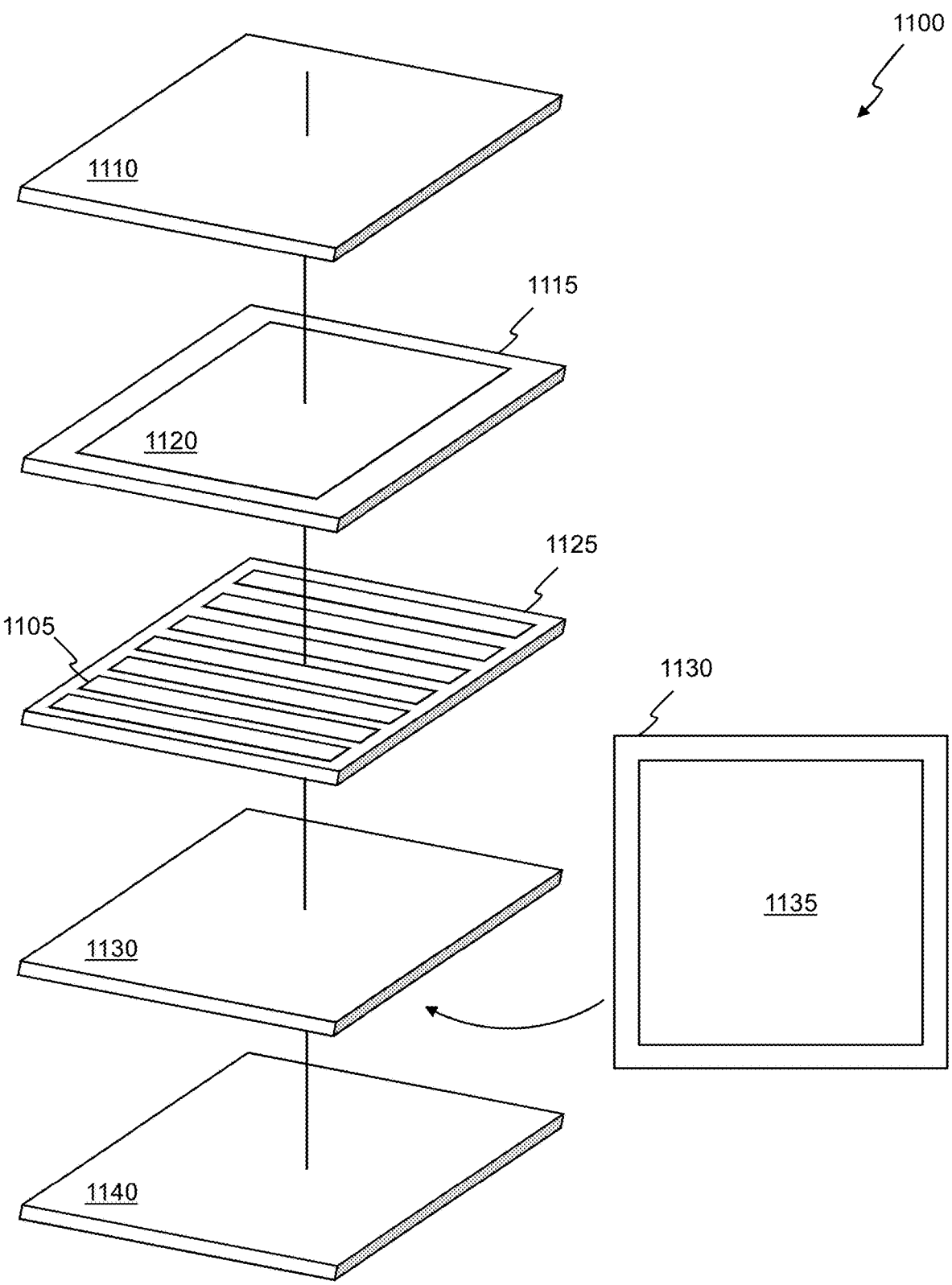
FIG. 11 depicts an exploded perspective view of a signal routing textile transmission line assembly that includes a planar conductive strip applied on a substrate and a conductive shielding layer applied on a dielectric material, in accordance with certain embodiments of the instant disclosure.

FIG. 11 depicts an exploded perspective view of a routing assembly 1100 that includes a plurality of planar conductive strips 1105 applied on a textile substrate 1125 and conductive shielding layers 1120 and 1135 applied on dielectric textiles 1115 and 1130 (both of which are dielectric spacers), respectively, in accordance with certain embodiments of the instant disclosure. The routing assembly 1100 is an embodiment of the assembly 115. The textile substrate 1125 is positioned between the dielectric textile 1115 and the dielectric textile 1130 with the conductive shielding layer 1120 and the shielding layer 1135 facing outward in opposing directions. The routing assembly 1100 also includes a textile encapsulating layer 1110 and a textile encapsulating layer 1140. When assembled, from the top down, the textile encapsulating layer 1110 is positioned on the dielectric textile 1115, which positioned on the textile substrate 1125, which positioned on the dielectric textile 1130, which is positioned on the textile encapsulating layer 1140.

Figure 12:
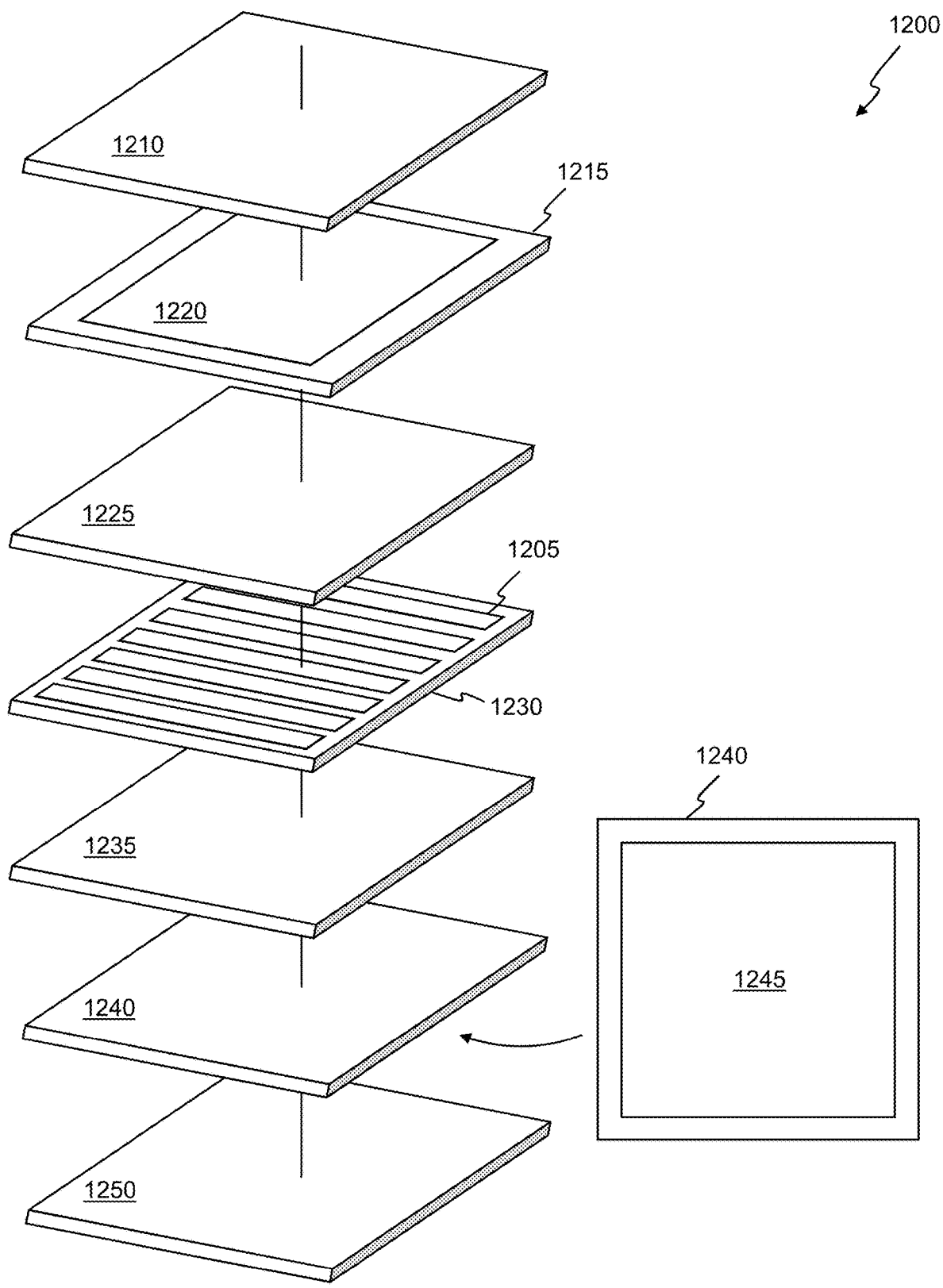
FIG. 12 depicts an exploded perspective view of a signal routing textile transmission line assembly that includes planar conductive strips applied to a substrate and a conductive shielding layer applied to a separate substrate, in accordance with yet still other embodiments of the instant disclosure.

FIG. 12 depicts an exploded perspective view of a routing assembly 1200 that includes planar conductive strips 1205 positioned on a textile substrate 1230, a conductive shielding layer 1220 positioned a textile substrate 1215, and a conductive shielding layer 1245 positioned on a textile substrate 1240, in accordance with yet still other embodiments of the instant disclosure. The routing assembly 1200 is an embodiment of the assembly 115. The routing assembly 1200 also includes a dielectric textile 1225 and a dielectric textile 1235, a dielectric spacer, between which the textile substrate 1230 is positioned. When assembled, from the top down, the textile substrate 1215 is positioned on the dielectric textile 1225, which is positioned on the textile substrate 1230, which is positioned on the dielectric textile 1235, which is positioned on the textile substrate 1240. The routing assembly 1200 also includes a textile encapsulating layer 1210 and a textile encapsulating layer 1250. When assembled, the textile encapsulating layer 1210 is positioned on the textile substrate 1215 and the conductive shielding layer 1220 and the textile encapsulating layer 1250 is positioned on the textile substrate 1240 and the conductive shielding layer 1245.

Figure 13:
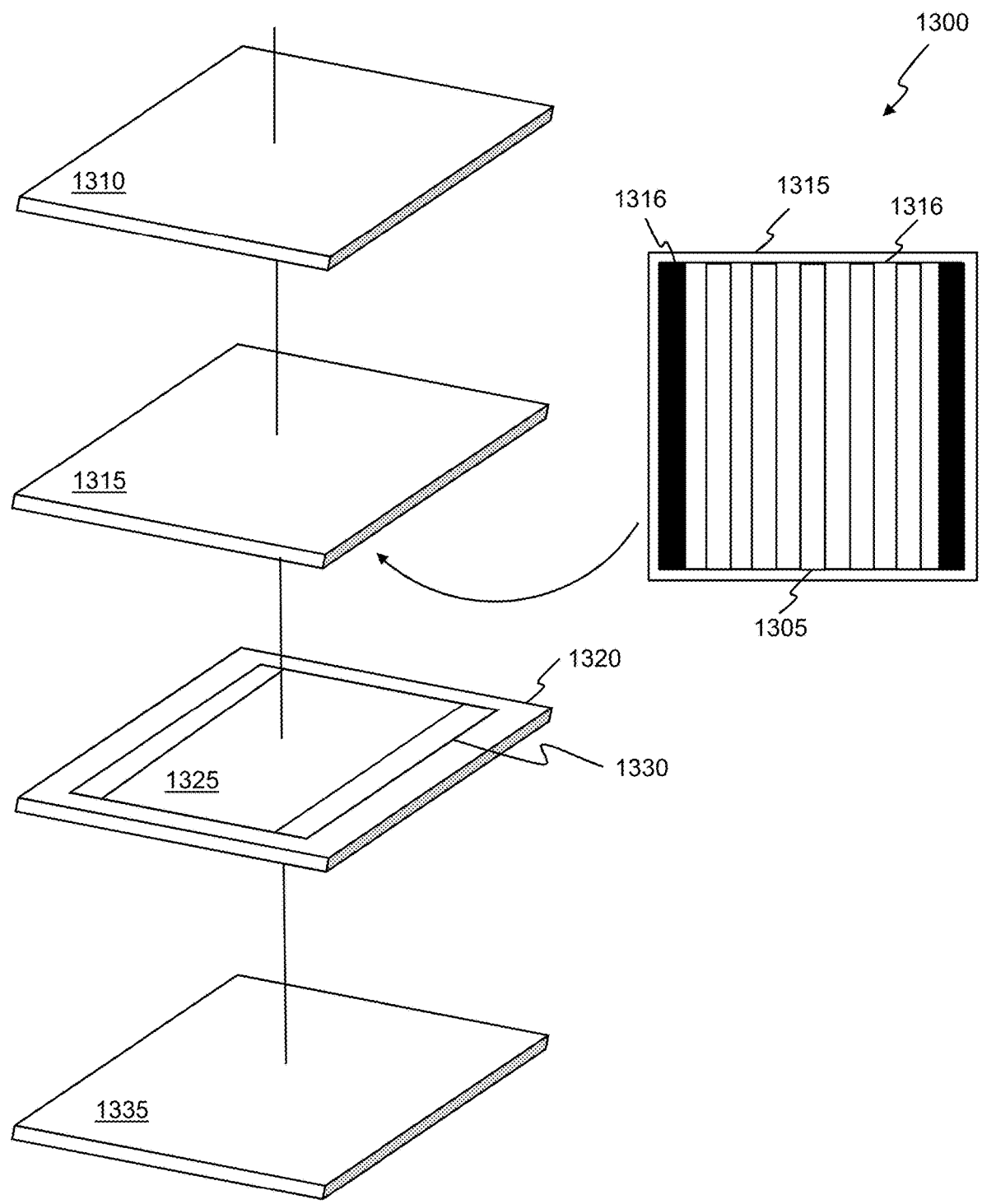
FIG. 13 depicts an exploded perspective view of a signal routing textile transmission line assembly that includes planar conductive strips applied to a dielectrically coated substrate and a conductive shielding layer applied to the periphery of a dielectrically coated substrate, in accordance with some embodiments of the instant disclosure.

FIG. 13 depicts an exploded perspective view of a routing assembly 1300 that includes planar conductive strips 1305 positioned on a dielectric substrate (i.e. textile substrate 1315 having a dielectric layer 1317 positioned thereon) and a conductive shielding layer 1325 applied to the periphery of a dielectric substrate (i.e. a textile substrate 1320 having a dielectric layer 1325 and conductive shielding strips 1330 positioned thereon), in accordance with some embodiments of the instant disclosure. The routing assembly 1300 is an embodiment of the assembly 115. When assembled, from top to bottom, the textile substrate 1315 is positioned on the textile substrate 1320 such that the dielectric layer 1317 is positioned on the dielectric layer 1325. The routing assembly 1200 also includes a textile encapsulating layer 1310 and a textile encapsulating layer 1335. When assembled, the textile encapsulating layer 1310 is positioned on the textile substrate 1315 and the textile encapsulating layer 1335 is positioned on the textile substrate 1335.

Figure 14:
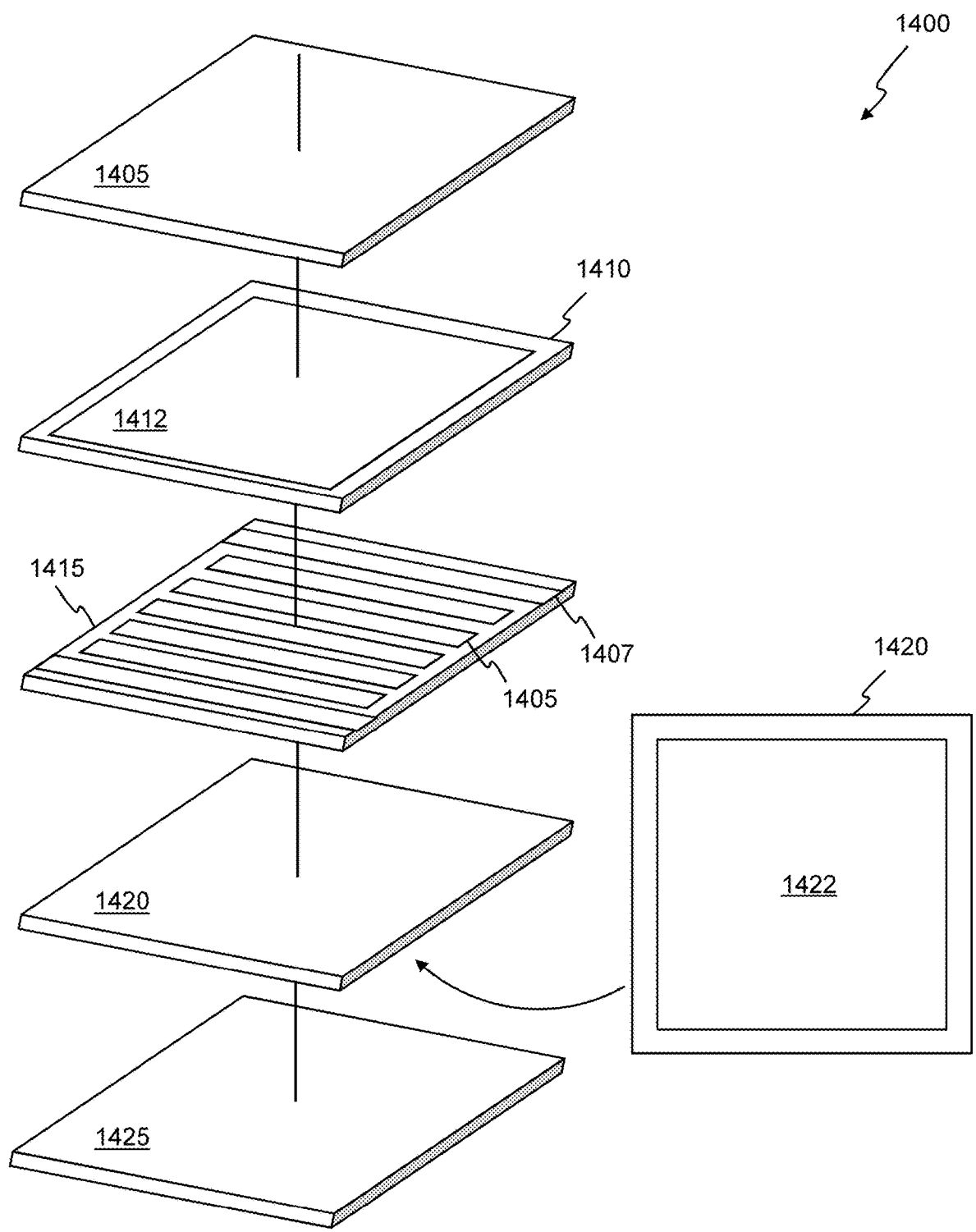
FIG. 14 depicts an exploded perspective view of a signal routing textile transmission line assembly that includes planar conductive strips and conductive shielding applied to a substrate and a conductive shielding layer applied to dielectric material that sandwich the substrate, in accordance with other embodiments of the instant disclosure.

FIG. 14 depicts an exploded perspective view of a routing assembly 1400 that includes planar conductive strips 1405 and conductive shielding strips 1407 positioned on a textile substrate 1415 and a conductive shielding layers 1412 and 1422 positioned on dielectric substrates 1412 and 1420, respectively, that sandwich the textile substrate, in accordance with other embodiments of the instant disclosure. When assembled, from top to bottom, the dielectric substrates 1410 is positioned on the textile substrate 1415 with the conductive shielding layer 1412, planar conductive strips 1405, and the conductive shielding strips 1407, which act as ground, each oriented upwards. The textile substrate 1415 is positioned on the dielectric substrate 1420 with the conductive shielding layer 1422 oriented downwards. The routing assembly 1400 also includes a textile encapsulating layer 1405 and a textile encapsulating layer 1425. When assembled, the textile encapsulating layer 1405 is positioned on the dielectric substrate 1410 and the textile encapsulating layer 1425 is positioned on the dielectric substrate 1420.

Figure 15:
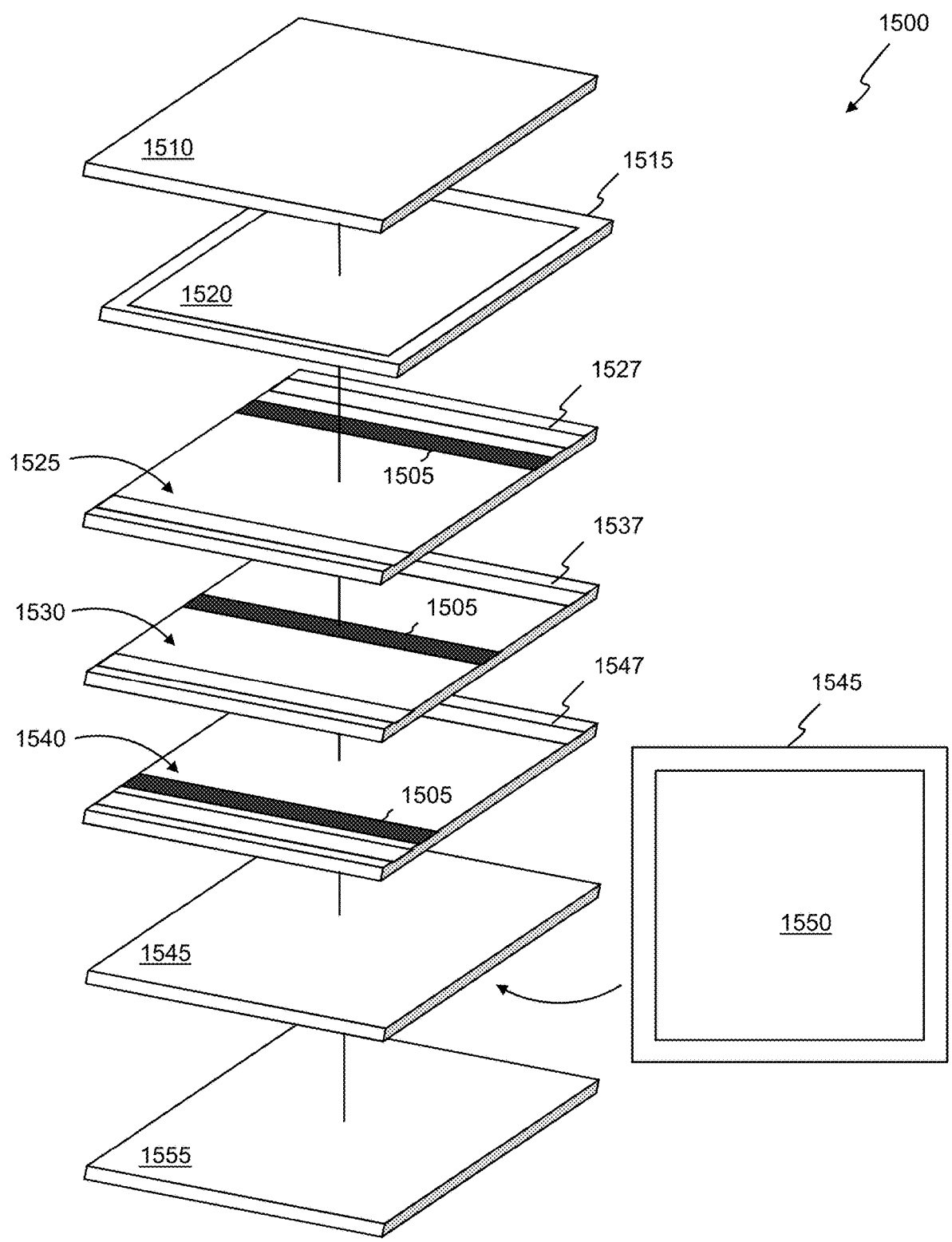
FIG. 15 depicts an exploded perspective view of a signal routing textile transmission line assembly that includes planar conductive strips applied to grounded substrates and a conductive shielding layer applied to dielectric materials that sandwich the grounded substrates, in accordance with certain embodiments of the instant disclosure.

FIG. 15 depicts an exploded perspective view of a routing assembly 1500 that includes planar conductive strips 1505 positioned on textile substrates 1525, 1530, and 1540 as well as conductive shielding layers 1520 and 1550 positioned on dielectric substrates 1515 and 1545, respectively, that sandwich the grounded substrates (i.e. the textile substrates 1525, 1530, and 1540), in accordance with certain embodiments of the instant disclosure. Unlike the aforementioned routing assemblies, the routing assembly 1500 includes at least one of the planar strips 1505 positioned on separate textile substrates (e.g., the textile substrate 1525, 1530, and 1540) positioned offset and oriented parallel to each other. The textile substrates 1525, 1530, and 1540 includes conductive shielding strips 1527, 1537, and 1547, respectively, which each act as ground and are peripherally positioned thereon. Hence, on each of the textile substrate 1525, 1530, and 1540 the planar conductive strips 1505 are each positioned between laterally positioned ground structures (i.e. the conductive shielding strips 1527, 1537, and 1547, respectively). In other words, the conductive shielding strips 1527, 1537, and 1547 are each laterally positioned relative to their respective planar conductive strips 1505. The dielectric substrates 1515 and 1545 include a conductive shielding layer 1520 and 1550 that is positioned thereon that substantially overlaps the planar conductive strips 1505 when the routing assembly 1500 is assembled. When assembled, the textile substrates 1525, 1530, and 1540 are positioned on each other in a user-defined order. For example, as depicted in the embodiment of FIG. 15, the textile substrate 1525 is positioned on the textile substrate 1530, which is positioned on the textile substrate 1540. Each set of the planar conductive strips 1505 are preferably co-oriented with each other as well as the conductive shielding strips 1527, 1537, and 1547 (i.e. the components are all oriented parallel to each other). The textile substrate 1525, 1530, and 1540 are positioned between the dielectric substrates 1515 and 1545 in a manner that allows the conductive shielding layers 1520 and 1550, respectively, to be oriented away the textile substrates 1525, 1530, and 1540 as well as each other. The routing assembly 1500 also includes a textile encapsulating layer 1510 and a textile encapsulating layer 1555. When the routing assembly 1500 is assembled, the textile encapsulating layer 1405 is positioned on the dielectric substrate 1515 and the dielectric substrate 1545 is positioned on the encapsulating layer 1555.

The textile substrates of the instant disclosure can share one or more features and/or characteristics. The dielectric textiles of the instant disclosure can share one or more features and/or characteristics. The textile encapsulating layers of the instant disclosure can share one or more features and/or characteristics. The conductive shielding layers of the instant disclosure can share one or more features and/or characteristics. The dielectric spacers of the instant disclosure can share one or more features and/or characteristics. The assemblies of the instant disclosure can share one or more features and/or characteristics. The routing assemblies of the instant disclosure can share one or more features and/or characteristics. Textile layers of the instant disclosure can be affixed together using any suitable means, including, but not limited to tape, adhesives, and thermal or pressure sealing materials (e.g., polyurethanes, PVC, etc.). Conductive shielding strips, dielectric layers, and conducting shielding layers can applied to surfaces as coatings or preformed structures.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

The invention claimed is:

1. A textile transmission line assembly, comprising:
a dielectric spacer that is a textile;
a conductive trace assembly positioned on the dielectric spacer;
a conductive ground assembly positioned on the dielectric spacer opposite the conductive trace assembly;
wherein
the conductive trace assembly comprises a planar conductive strip and a first encapsulating textile layer positioned proximate to and co-aligned with the planar conductive strip, the first encapsulating layer encloses the planar conductive strip on the dielectric spacer or a first textile layer positioned proximate to the dielectric spacer;
the conductive ground assembly comprises a conductive shielding layer and a second encapsulating textile layer positioned proximate to the conductive shielding layer, the second encapsulating layer is co-aligned with the conductive shielding layer, the second encapsulating layer encloses the conductive shielding layer on the dielectric spacer or a second textile layer positioned proximate to the dielectric spacer;
the conductive trace assembly is operatively coupled to the conductive ground assembly;
the conductive trace assembly is co-aligned with the conductive ground assembly; the textile transmission line assembly is planar and flexibly affixes to a textile item;
the planar conductive strip is dielectrically isolated; and
at least one of the first encapsulating layer and the second encapsulating layer are dielectric textiles.

2. The textile transmission line assembly of claim 1, wherein
at least one of the conductive trace and the conductive shielding layer comprise a conductive composition;
the conductive composition comprises:
a polymer; and
at least one of a metal, fully exfoliated graphene sheets, carbon nanotubes, and graphite.

3. The textile transmission line assembly of claim 1, wherein
at least one of the planar conductive strip and the conductive ground assembly is affixed to the dielectric spacer.

4. The textile transmission line assembly of claim 1, wherein
the dielectric spacer comprises one or more of a foam, cellulose, an elastomer, a fluoropolymer, neoprene, PVDF, melamine, polyamides, spandex, a thermoplastic elastomer, spandex, and scuba fabric.

5. The textile transmission line assembly of claim 1, wherein
the dielectric spacer comprises an electromagnetic shielding layer affixed thereto.

6. The textile transmission line assembly of claim 1, wherein
the conductive trace assembly comprises a textile substrate; and
the planar conductive strip is positioned on the textile substrate.

7. The textile transmission line assembly of claim 1, wherein
the conductive ground assembly comprises a textile substrate; and the conductive shielding layer is positioned on the textile substrate.

8. The textile transmission line assembly of claim 1, wherein
the conductive trace assembly comprises an antenna element; and
the planar conductive strip is positioned proximate to and conductively coupled to the antenna element.

9. The textile transmission line assembly of claim 8, wherein
the antenna element comprises a conductive composition;
the conductive composition comprises:
a polymer; and
at least one of a metal, fully exfoliated sheets of graphene, carbon nanotubes, and graphite.

10. The textile transmission line assembly of claim 8, wherein
the antenna element and the planar conductive strip are a continuous conductive structure.

11. The textile transmission line assembly of claim 1, wherein
the dielectric spacer comprises:
a textile substrate;
a dielectric coating affixed to the textile substrate; and
the dielectric coating is wider than the conductive strip.

12. A textile transmission line assembly, comprising:
a dielectric spacer that is a textile;
a conductive trace assembly positioned on the dielectric spacer;
a conductive ground assembly positioned on the dielectric spacer opposite the conductive trace assembly;
wherein
the conductive trace assembly comprises a planar conductive strip and a first encapsulating layer positioned proximate to and co-aligned with the planar conductive strip, the first encapsulating layer encloses the planar conductive strip on the dielectric spacer or a first textile layer positioned proximate to the dielectric spacer;
the conductive ground assembly comprises a conductive shielding layer and a second encapsulating layer positioned proximate to the conductive shielding layer, a second dielectric substrate is co-aligned with the conductive shielding layer, the second encapsulating layer encloses the conductive shielding layer on the dielectric spacer or a second textile layer positioned proximate to the dielectric spacer;
the conductive trace is operatively coupled to the conductive ground assembly;
the conductive trace assembly is co-aligned with the conductive ground assembly;
the textile transmission line assembly is planar and flexibly affixes to a garment;
the planar conductive strip is dielectrically isolated;
the first encapsulating layer and the second encapsulating layer are dielectric textiles;
the conductive trace assembly is conductively coupled to an antenna element; and
the antenna element and the planar conductive strip are a continuous conductive structure.

13. The textile transmission line assembly of claim 12, wherein
at least one of the conductive trace, the conductive shielding layer, and the antenna element comprise a conductive composition;
the conductive composition comprises:
a polymer; and
at least one of a metal, fully exfoliated graphene sheets, carbon nanotubes, and graphite.

14. The textile transmission line assembly of claim 12, wherein
at least one of the planar conductive strip and the conductive ground assembly is affixed to the dielectric spacer.

15. The textile transmission line assembly of claim 12, wherein
the dielectric spacer comprises one or more of a foam, cellulose, an elastomer, a fluoropolymer, neoprene, PVDF, melamine, polyamides, spandex, a thermoplastic elastomer, spandex, and scuba fabric.

16. The textile transmission line assembly of claim 12, wherein
the dielectric spacer comprises an electromagnetic shielding layer affixed thereto; and
the electromagnetic shielding layer comprises a conductive composition;
the conductive composition comprises:
a polymer; and at least one of a metal, fully exfoliated graphene sheets, carbon nanotubes, and graphite.

17. The textile transmission line assembly of claim 12, wherein at least one of the following conditions is satisfied:
the conductive trace assembly comprises a first textile substrate, the planar conductive strip is positioned on the first textile substrate; and
the conductive ground assembly comprises a second textile substrate, the conductive shielding layer is positioned on the second textile substrate.

18. The textile transmission line assembly of claim 12, wherein
the dielectric spacer comprises:
a textile substrate;
a dielectric coating affixed to the textile substrate; and
the dielectric coating is wider than the conductive strip.

19. A textile transmission line assembly, comprising:
a dielectric spacer that is a textile;
a conductive trace assembly positioned on the dielectric spacer;
a conductive ground assembly positioned on the dielectric spacer opposite the conductive trace assembly;
wherein
the conductive trace assembly comprises a planar conductive strip and a first encapsulating layer positioned proximate to and co-aligned with the planar conductive strip, the first encapsulating layer encloses the planar conductive strip on the dielectric spacer or a first textile layer positioned proximate to the dielectric spacer;
the conductive ground assembly comprises a conductive shielding layer and a second encapsulating layer positioned proximate to the conductive shielding layer, a second dielectric substrate is co-aligned with the conductive shielding layer, the second encapsulating layer encloses the conductive shielding layer on the dielectric spacer or a second textile layer positioned proximate to the dielectric spacer;
the conductive trace is operatively coupled to the conductive ground assembly; the conductive trace assembly is co-aligned with the conductive ground assembly;
the textile transmission line assembly is planar and flexibly affixes to a garment;
the planar conductive strip is dielectrically isolated;
the first encapsulating layer and the second encapsulating layer are dielectric textiles;
at least one of the conductive trace and the conductive shielding layer comprise a conductive composition;
the conductive composition comprises:
a polymer;
at least one of a metal, fully exfoliated graphene sheets, carbon nanotubes, and graphite; and at least one of the planar conductive strip and the conductive ground assembly is affixed to the dielectric spacer.

20. The textile transmission line assembly of claim 19, wherein
the conductive trace assembly comprises an antenna element, the antenna element and the planar conductive strip are a continuous conductive structure, and at least one of the following conditions is satisfied:
the dielectric spacer comprises an electromagnetic shielding layer affixed thereto;
the conductive trace assembly comprises a textile substrate, the planar conductive strip is positioned on the textile substrate;
the conductive ground assembly comprises a textile substrate, the conductive shielding layer is positioned on the textile substrate; and
the dielectric spacer comprises:
a textile substrate;
a dielectric coating affixed to the textile substrate; and
the dielectric coating is wider that than the conductive strip.

\* \* \* \* \*